(12) United States Patent
Guo et al.

(10) Patent No.: US 9,606,542 B2
(45) Date of Patent: Mar. 28, 2017

(54) DISCOVERY AND MONITORING OF AN ENVIRONMENT USING A PLURALITY OF ROBOTS

(75) Inventors: Shang Q. Guo, Courtland Manor, NY (US); Canturk Isci, West New York, NJ (US); Jonathan Lenchner, North Salem, NY (US); Maharaj Mukherjee, Wappingers Falle, NY (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 13/348,846

(22) Filed: Jan. 12, 2012

(65) Prior Publication Data

US 2013/0184864 A1    Jul. 18, 2013

(51) Int. Cl.
G05D 1/02       (2006.01)
G08G 1/00       (2006.01)
G05B 19/418     (2006.01)

(52) U.S. Cl.
CPC ......... G05D 1/0291 (2013.01); G05D 1/0274 (2013.01); *G05B 19/41815* (2013.01); *G05B 2219/39146* (2013.01); *G05B 2219/39168* (2013.01); *G05D 2201/0207* (2013.01); *G08G 1/20* (2013.01)

(58) Field of Classification Search
CPC ............ G05B 19/418; G05B 19/41815; G05B 2219/39146; G05B 2219/39168; G05D 1/0274; G05D 1/0291; G05D 2201/0207; B25J 9/1682; B25J 5/00; B25J 5/007; G08G 1/20; Y10S 901/01

USPC ..................... 701/29.3, 482, 422; 901/1, 50; 700/247–248
See application file for complete search history.

(56) References Cited

U.S. PATENT DOCUMENTS

| | | | |
|---|---|---|---|
| 6,507,771 | B2 | 1/2003 | Payton et al. |
| 6,577,906 | B1 | 6/2003 | Hurtado et al. |
| 6,687,571 | B1 | 2/2004 | Byrne et al. |
| 7,089,084 | B2 | 8/2006 | Ohta et al. |
| 7,305,371 | B2 | 12/2007 | Brueckner et al. |

(Continued)

OTHER PUBLICATIONS

Final Exam Solutions, COM S211/ENGRD 211, May 15, 2003.*

(Continued)

*Primary Examiner* — Abby Lin
(74) *Attorney, Agent, or Firm* — Ryan, Mason & Lewis, LLP

(57) ABSTRACT

Techniques are provided for discovery and monitoring of an environment using a plurality of robots. A plurality of robots navigate an environment by determining a navigation buffer for each of the robots; and allowing each of the robots to navigate within the environment while maintaining a substantially minimum distance from other robots, wherein the substantially minimum distance corresponds to the navigation buffer, and wherein a size of each of the navigation buffers is reduced over time based on a percentage of the environment that remains to be navigated. The robots can also navigate an environment by obtaining a discretization of the environment to a plurality of discrete regions; and determining a next unvisited discrete region for one of the plurality of robots to explore in the exemplary environment using a breadth-first search. The plurality of discrete regions can be, for example, a plurality of real or virtual tiles.

10 Claims, 14 Drawing Sheets

(56) References Cited

U.S. PATENT DOCUMENTS

| | | |
|---|---|---|
| 7,409,266 B2 | 8/2008 | Hara et al. |
| 7,844,364 B2 | 11/2010 | McLurkin et al. |
| 2004/0193348 A1 | 9/2004 | Gray et al. |
| 2004/0220724 A1 | 11/2004 | Hahn et al. |
| 2011/0010083 A1 | 1/2011 | Lee et al. |
| 2011/0054689 A1 | 3/2011 | Nielsen et al. |
| 2011/0288684 A1 | 11/2011 | Farlow et al. |

OTHER PUBLICATIONS

Intel Pentium Processor Family Developer's Manual 1997, Section 6.1 and 6.2.*
Graph Search Techniques (Mar 27, 2010) Breadth-First Search section, GWU.*
Nikolaus Correl and Alcherio Martinoli, Multirobot Inspection of Industrial Machinery, IEEE Robotics & Automation Magazine, Mar. 2009. (Reference provided in Office action dated Mar. 9, 2015).*
Chelsea Zhang, Parallelizing Depth First Search for Robotic Graph Exploration, Thesis, Harvard College, 2010.*
Klancar et al., "Case Study of the Collision-Avoidance Problem Based on Bersein-Bezier Path Tracking for Multiple Robots with Known Constraints," in : Journal of Intelligent and Robotic Systems, vol. 60, pp. 317-337 (Apr. 2010).

\* cited by examiner

| | | | | | |
|---|---|---|---|---|---|
| | | | | | x |
| | | /////// | /////// | /////// | /////// |
| | 2,UU | x | | | |
| 2,LU | 1,U | 2,RU | | x | x |
| 1,L | R₁ | 1,R | /////// | /////// | /////// |
| 2,LD | 1,D | 2,DR | | | |

| | | | | | |
|---|---|---|---|---|---|
| | 4,LUUU | | | | X |
| 4,LUUU | 3,UUU | ///// | ///// | ///// | ///// |
| 3,LUU | 2,UU | $\sqrt{R_2}$ 3,UUR | 4,RURU | | |
| 2,LU | 1,U | 2,RU | 3,RUR | $\sqrt{R_1}$ 4,RURR | X |
| 1,L | $R_1$ | 1,R | ///// | ///// | ///// |
| 2,LD | 1,D | 2,DR | 3,DRR | 4,DRRR | |

| | | | | | |
|---|---|---|---|---|---|
| | | | | | X |
| 5,DRLLU | $R_2$ | ///// | ///// | ///// | ///// |
| 4,DRLL | 3,DRL | $\sqrt{R_2}$ 2,DR | 3,DRR | 4,DRRR | 5,DRRRR |
| 5,DRLDL | 4,DRLD | 3,DRD | 4,DRDR | $\sqrt{R_1}$ 5,DRDRR | $\sqrt{R_1}$ |
| | 5,DRLDD | 4,DRDD | ///// | ///// | ///// |
| | | 5,DRDDD | | | |

710 ← (pointing to row with 4,DRLL etc.)

1110, 910 ← (pointing to √R₁ cell)

DISCOVERY AND MONITORING OF AN ENVIRONMENT USING A PLURALITY OF ROBOTS

FIELD OF THE INVENTION

The present invention relates to automated techniques for the coordination of multiple mobile robots for exploring and monitoring a given environment or region.

BACKGROUND OF THE INVENTION

Data centers are consuming ever more energy. Recognizing that cooling is a significant contributor to energy consumption, data center operators are beginning to tolerate higher operating temperatures. While this practice saves substantial amounts of energy, running closer to allowable operating temperature limits increases the risk that temperature problems will result in equipment failures that wipe out the financial benefits of saving energy. Vigilance is needed, and increasingly that vigilance is being provided by data center energy management software that monitors data center environmental conditions, such as temperature, and alerts operators when troublesome hot spots develop.

A number of techniques have been proposed or suggested for employing one or more robots to automatically navigate, map and monitor data centers. For example, J. Lenchner et al., "Towards Data Center Self-Diagnosis Using a Mobile Robot," ACM Int'l Conf on Autonomic Computing (ICAC '11) (2011), incorporated by reference herein, discloses a robot that serves as a physical autonomic element to automatically navigate, map and monitor data centers. The disclosed robot navigates a data center, mapping its layout and monitoring its temperature and other quantities of interest with little, if any, human assistance. In addition, U.S. patent application Ser. No. 12/892,532, filed Sep. 28, 2010, entitled "Detecting Energy and Environmental Leaks in Indoor Environments Using a Mobile Robot," incorporated by reference herein, discloses techniques for energy and environmental leak detection in an indoor environment using one or more mobile robots.

While the use of robots has greatly improved the ability to automatically monitor indoor environments, they suffer from a number of limitations, which if overcome, could further extend the utility and efficiency of robots that are monitoring an indoor environment. For example, it is challenging for a plurality of robots to efficiently navigate an indoor environment without getting in each other's way, especially towards the end of the exploration. A number of existing navigation techniques employ the well-known Frontier-Based A* incremental navigation method, first described for a single robot in Peter Hart et al., "A Formal Basis for the Heuristic Determination of Minimum Cost Paths," SIGART Newsletter, 37: 28-29 (1972), and more recently described in the context of multiple robots, by Yamauchi, "Frontier-Based Exploration Using Multiple Robots," Proc. of the Int'l Conf. on Autonomous Agents (1998). In addition, a number of existing navigation techniques have also integrated the idea of each robot carrying a "potential field" so that robots are forced to stay at some manually tuned distance from one another. See, e.g., Yong K. Hwang and Narandra Ahuja, "A Potential Field Approach to Path Planning," IEEE Trans. On Robotics and Automation Actions, Vol. 8, Issue 1 (IEEE, 1992).

A need remains for more efficient navigation methods for robots that automatically navigate, map and monitor environments, particularly well-structured indoor environments such as data centers.

SUMMARY OF THE INVENTION

Generally, aspects of the invention provide discovery and monitoring of an environment using a plurality of robots. According to one aspect of the invention, a plurality of robots navigate an environment by determining a navigation buffer for each of the robots; and allowing each of the robots to navigate within the environment while maintaining a substantially minimum distance from other robots, wherein the substantially minimum distance corresponds to the size of the navigation buffers, and wherein a size of each of the navigation buffers is reduced over time based on a percentage of the environment that remains to be navigated.

The size of the navigation buffers can be reduced, for example, in direct proportion to the percentage of the environment that remains to be navigated. The environment can be a known or unknown environment. The navigation buffers can be initialized, for example, to a starting area for fitting k uniform navigation buffers inside the environment. Exemplary navigation buffers include circles, ellipses, squares, rectangles, other polygons, and so on. If the robots are capable of navigating in three dimensions, the zones can be three dimensional as well, with analogous sample navigation buffers being spheres, ellipsoids, cubes or rectangular solids.

According to another aspect of the invention, a plurality of robots navigate an environment by obtaining a discretization of the environment to a plurality of discrete regions; and determining a next unvisited discrete region for one of the plurality of robots to explore in the exemplary environment using a breadth-first search. The plurality of discrete regions can be, for example, a plurality of real or virtual tiles.

A more complete understanding of the present invention, as well as further features and advantages of the present invention, will be obtained by reference to the following detailed description and drawings.

BRIEF DESCRIPTION OF THE DRAWINGS

FIGS. 6 through 13 illustrate the navigation by exemplary robots $R_1$ and $R_2$ through the exemplary indoor environment of FIG. 1 using the breadth-first search path determination process of FIG. 5 to determine the next unvisited tile.

DETAILED DESCRIPTION OF PREFERRED EMBODIMENTS

The present invention provides improved multi-robot navigation in previously known and also previously unknown environments. According to a varying potential field aspect of the invention, multi-robot navigation of known and unknown environments is improved by varying the radius of the potential field based on the percentage of area that remains to be explored in a known environment, or the estimated percentage of area that remains to be explored in an unknown environment. The potential fields are also referred to herein as "navigation buffers." Generally, the radius of the exemplary potential field decreases as the percentage (or estimated percentage) of the indoor environment that remains unexplored decreases. While the varying potential field aspect of the invention is illustrated using circles having substantially uniform radii around each robot, navigation buffers of any shape and of varying sizes can be established around each robot, as would be apparent to a person of ordinary skill in the art.

According to a breadth-first search aspect of the invention, multi-robot navigation of known environments is improved using breadth-first searching (BFS) to determine paths through the known environment for a plurality of robots. The disclosed breadth-first search technique employs a polynomial-time recursive heuristic that prevents two or more robots from trying to visit the same portion of the environment. Generally, each robot incrementally creates a breadth-first search tree and they collectively attempt to find the next unvisited location within the environment. Each robot updates its respective BFS tree to accommodate the robot that was the first one to successfully find an unvisited location.

Generally, a breadth-first search (BFS) is a graph search algorithm that begins at the root node and explores all the neighboring nodes. Then, for each of those nearest nodes, the graph search algorithm explores all of their unexplored neighbor nodes, and so on, until the desired node is found (i.e., a previously unvisited tile).

The term "building," as used herein, is intended to refer to a variety of facilities, including, but not limited to, data centers hosting large amounts of information technology (IT) equipment, as well as industrial office space and residential buildings.

Figure 1:
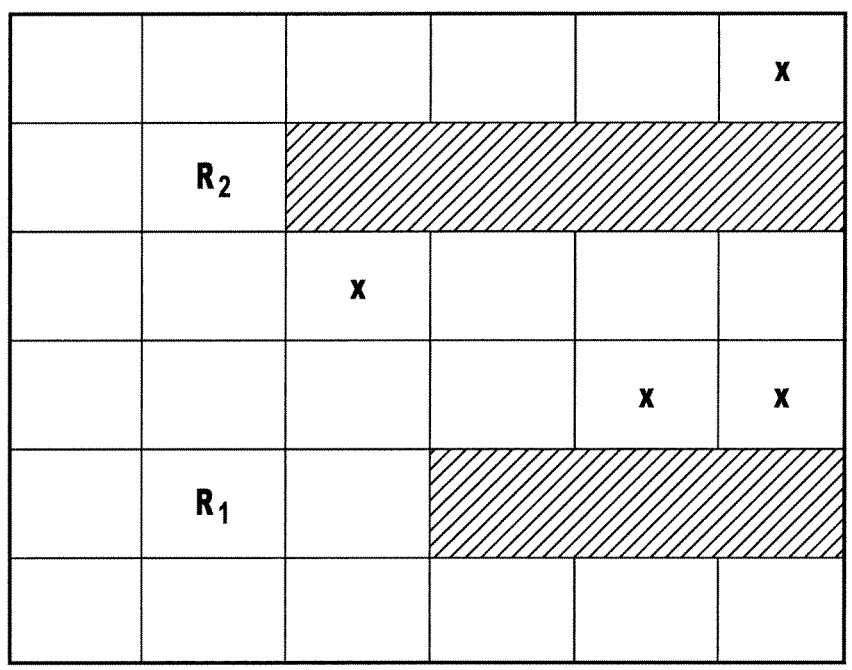
FIG. 1 illustrates an exemplary indoor environment in which the present invention can be employed.

FIG. 1 illustrates an exemplary indoor environment 100 in which the present invention can be employed. Let a set of robots $\{R_1, \ldots, R_k\}$ be given and suppose that the space to be explored within the exemplary indoor environment 100 has been discretized into a set of square "tiles." In some practical environments, such as computer data centers, the natural discretization unit is in fact a physical floor or ceiling tile. In other environments, the discretization unit may be virtual tiles. The exemplary indoor environment 100 of FIG. 1 comprises an exemplary array of 6-by-6 tiles, being explored by two exemplary robots $R_1$ and $R_2$. Tiles marked with an x in the exemplary indoor environment 100 remain unvisited. Tiles filled with a cross-hatched pattern indicate the presence of obstacles. As discussed further below in conjunction with FIGS. 2 through 4, the exemplary robots $R_1$ and $R_2$ navigate paths through the exemplary indoor environment 100 using the varying potential field aspect of the invention. As discussed further below in conjunction with FIGS. 5 through 13, the exemplary robots $R_1$ and $R_2$ navigate paths through the exemplary indoor environment 100 using the breadth-first searching aspect of the invention.

For a detailed discussion of suitable exemplary robots, see, for example, U.S. patent application Ser. No. 12/892,532, filed Sep. 28, 2010, entitled "Detecting Energy and Environmental Leaks in Indoor Environments Using a Mobile Robot," incorporated by reference herein. The term "robot," as used herein, refers generally to any form of mobile electro-mechanical device that can be controlled by electronic or computer programming. In this basic form, as will be described in detail below, the exemplary robots move throughout the designated portions of the building 100 and take temperature, air flow and/or airborne matter measurements as well as time and positioning data (so as to permit the temperature, air flow and/or airborne matter data to be associated with a given position in the building 100 at a particular time). The robots should be capable of moving in various directions along the floor of the building, so as to navigate where the robots need to go and to maneuver around obstacles, such as equipment, furniture, walls, etc. in the building 100.

It is preferable that the robots (e.g., $R_1$ and $R_2$ of 100) have the capability to collect and store the data, i.e., temperature, air flow and/or airborne matter measurements and time/positioning data, to allow for analysis at a later time though it is also possible that the data be streamed to a controlling or server computer where said data may be processed and/or stored.

As discussed hereinafter, the exemplary indoor environment 100 can be a known or unknown environment. As indicated above, the varying potential field aspect of the invention can be used to navigate known and unknown environments. Likewise, the breadth-first search aspect of the invention can be used to navigate known environments. The varying potential field and breadth-first search aspects of the invention can be combined in the case of known environments, especially with many robots where the computation time and space costs of the breadth-first search may be prohibitive. In a known grid-space, for example, the varying potential field approach can be used until, for example, 5R grid points remain unvisited, where R is the number of robots.

Navigation Buffers Based on Percentage of Unexplored Area

Figure 2:
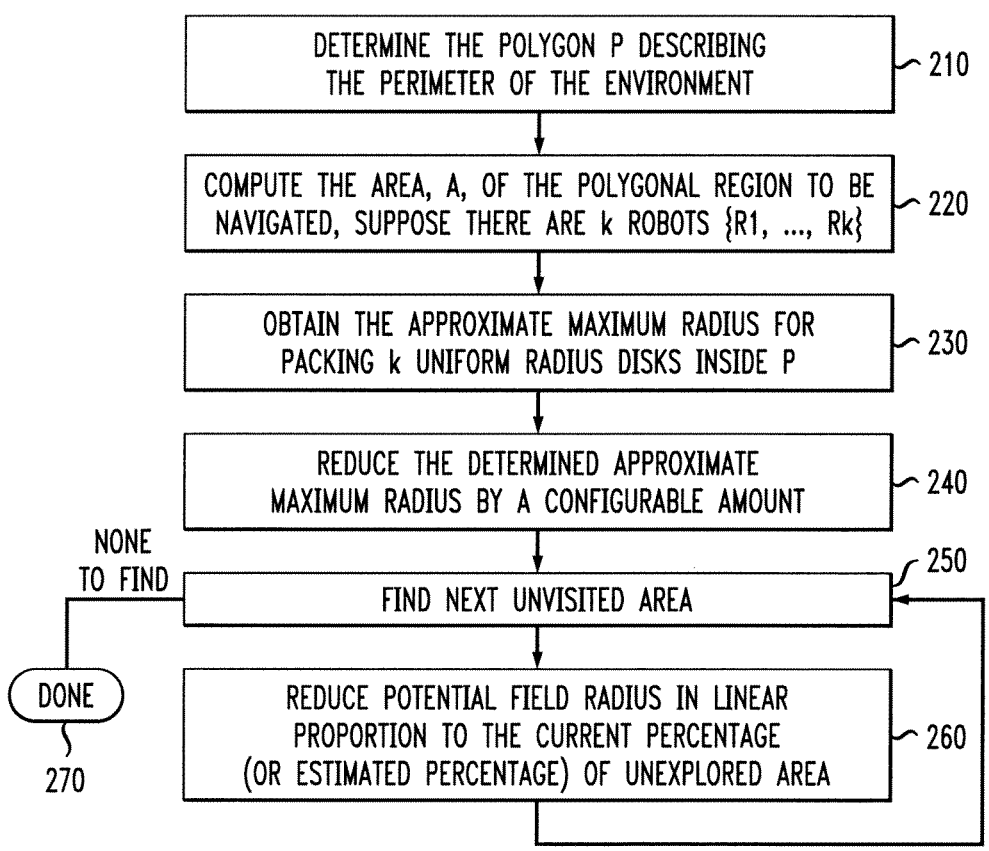
FIG. 2 is an exemplary flowchart for a potential field radius determination process incorporating aspects of the present invention.

FIG. 2 is an exemplary flowchart for a potential field radius determination process 200 incorporating aspects of the present invention in which the navigation buffers are all circles of uniform radius. As shown in FIG. 2, the potential field radius determination process 200 initially starts with a polygon P, determined during step 210, describing the perimeter of the environment to be navigated. Next, the potential field radius determination process 200, during step 220 computes the area, A, of the region to be navigated and initializes itself to the fact that there are k robots $\{R_1, \ldots, R_k\}$.

The potential field radius determination process 200 then obtains an approximately maximum (starting) radius during step 230 for packing k uniform radius disks inside P by trying disk packings at different radii using a binary search over plausible radii and, for example, using standard grid shifting methods, see e.g., D. Hochbaum and W. Maas, "Approximation Schemes for Covering and Packing Problems in Image Processing and VLSI," 32(1): 130-136, 1985, to achieve each packing. The determined maximum radius is then reduced during step 240 by a configurable amount, such as 10-20%, to ensure that the robots have room to move and that the determined maximum radius is an underestimate. It is again noted that navigation buffers of any shape and of varying sizes can be established around each robot, as would be apparent to a person of ordinary skill in the art.

In step 250, the robots collectively try to find the next not-yet-visited area, and, as the percentage of area that has been explored increases, the potential field radius is reduced, for example, in linear proportion, during step 260 to the current percentage of unexplored area. In the event that the region to be explored is unknown in advance, the exact percentage of unexplored area at any point in time must of course be estimated, utilizing the area of the bounding polygon and the fraction of area so-far explored that has turned out to contain obstacles. When there is no next unvisited area, in other words when the area has been completely explored, the process completes in step 270.

Figure 3:
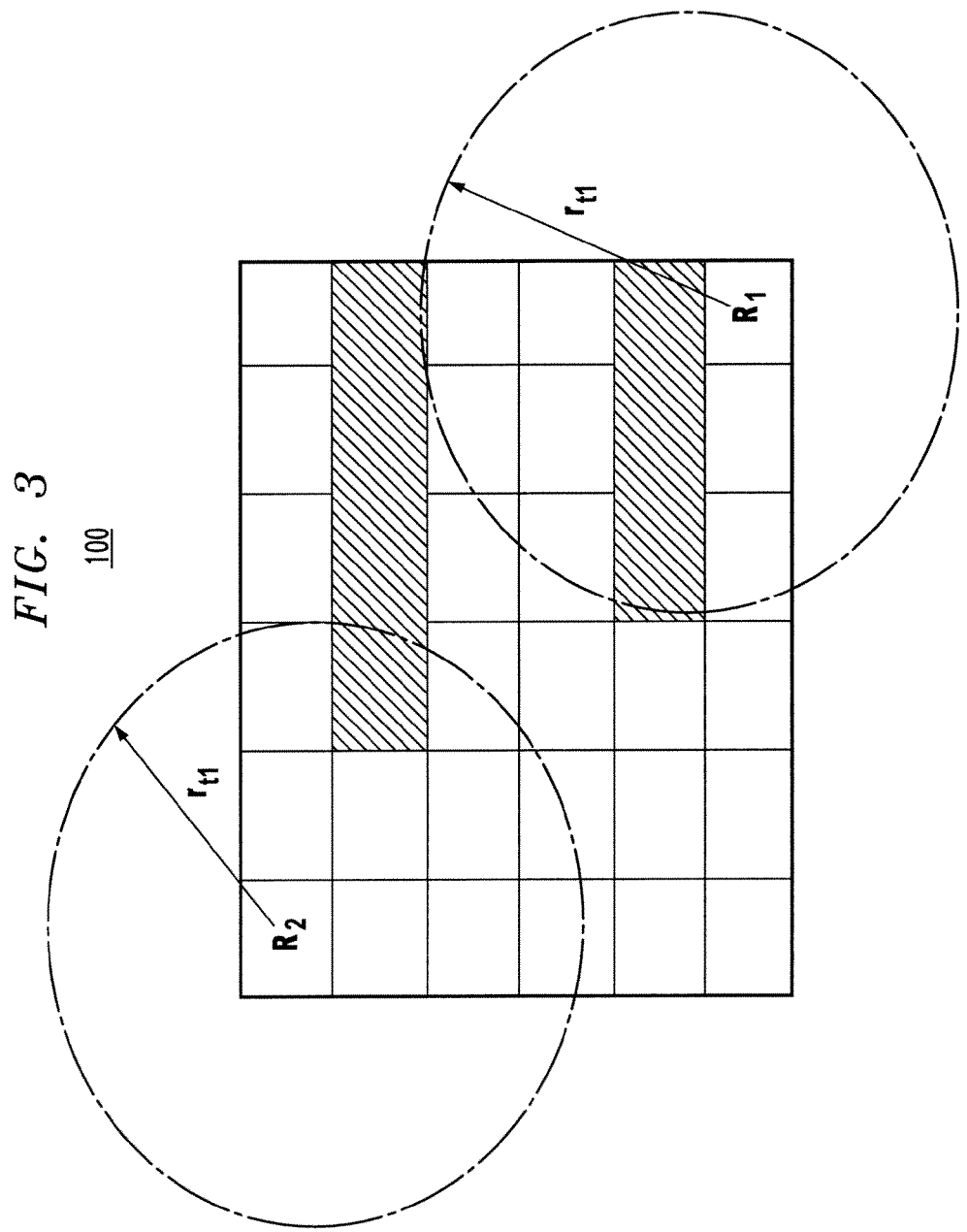
FIGS. 3 and 4 illustrate the navigation by exemplary robots $R_1$ and $R_2$ through the exemplary indoor environment of FIG. 1 using the disclosed varying potential field navigation technique.
Figure 4:
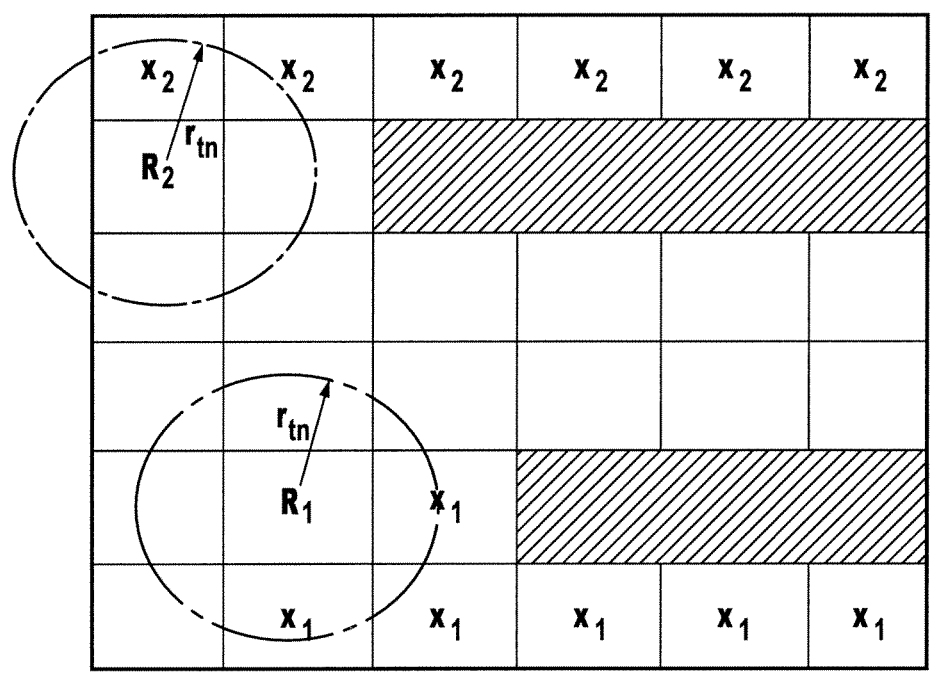

FIGS. 3 and 4 illustrate the navigation by the exemplary robots $R_1$ and $R_2$ through the exemplary indoor environment 100 using the varying potential field aspect of the invention. FIG. 3 illustrates the navigation by the exemplary robots $R_1$ and $R_2$ at a first time, $t_1$, and FIG. 4 illustrates the navigation by the exemplary robots $R_1$ and $R_2$ at a later time, $t_n$, after a certain fraction of tiles have been explored. The tiles marked with $X_2$s indicate that robot $R_2$ has explored the tiles while those marked with $X_1$s indicate that robot $R_1$ has explored the tiles. It is noted that the radius, $r_{t1}$, at time $t_1$ is greater than the radius, $r_{tn}$, at time $t_n$, since the percentage of the exemplary indoor environment 100 that remains unexplored has reduced over time. The number of tiles that remain unexplored at time $t_1$, of FIG. 3 is 27 tiles, while the number of tiles that remain unexplored at time $t_n$, of FIG. 4 is 15 tiles. The potential fields or navigation buffers associated with the various robots are given by the associated circles, or disks, around them at the given time, in other words the disks of radius $r_{t1}$, at time $t_1$ in FIG. 3 and those of radius $r_{tn}$, at the later time, $t_n$, in FIG. 4. At any given time $t_i$ these disks serve to keep the robots at least a distance of $2r_{ti}$ apart. In a further variation, the potential fields or navigation buffers can serve to keep the robots at least a distance of $r_{ti}$ apart (i.e., a given robot can continue moving as long as another robot itself is not within the navigation zone of the given robot). In yet another variation, the radii or shape area can be proportional to the speed of each robot (as well as proportional to the amount of remaining/unvisited space).

Breadth-First Search Navigation

Figure 5:
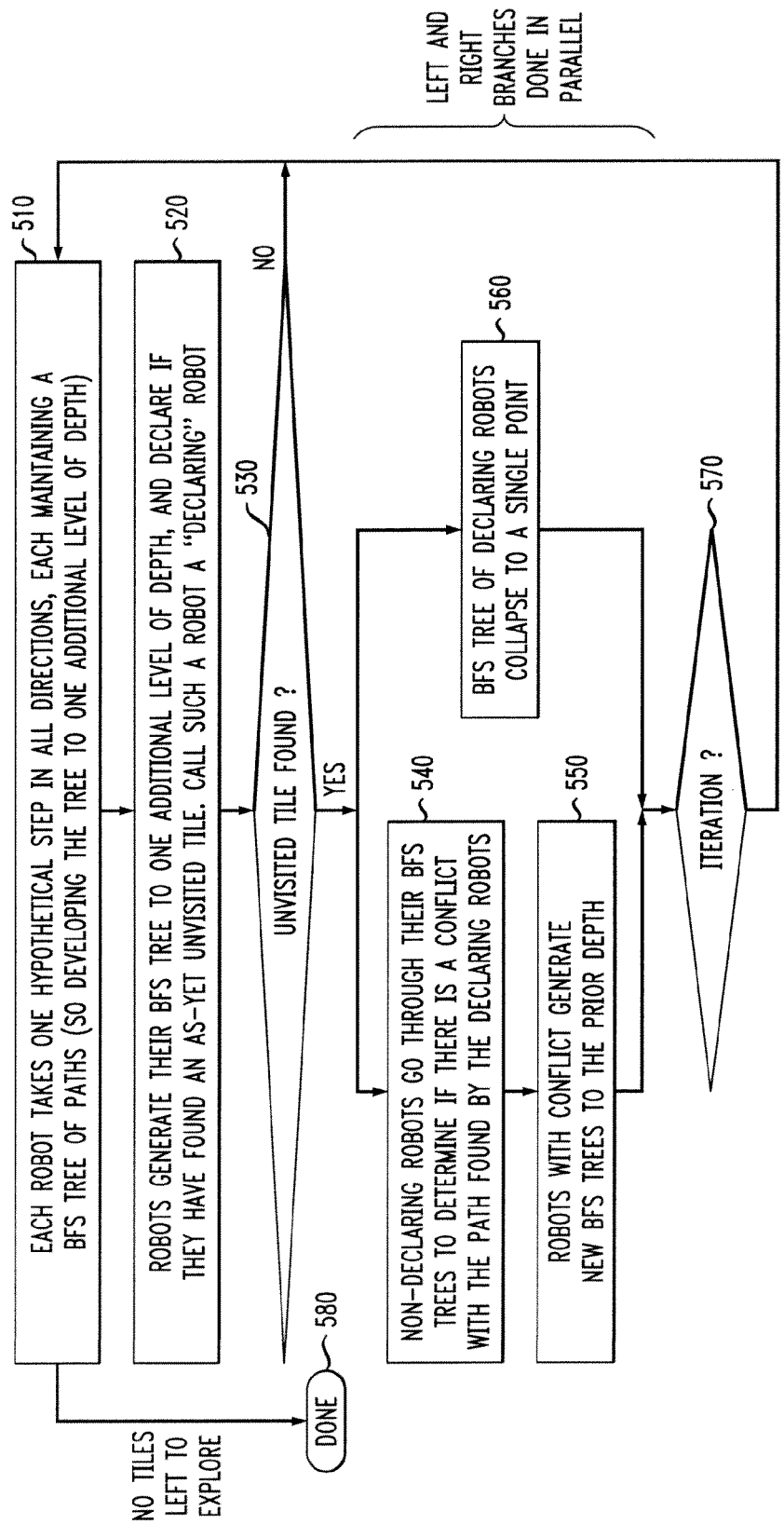
FIG. 5 is an exemplary flowchart for a breadth-first search path determination process incorporating aspects of the present invention.

FIG. 5 is an exemplary flowchart for a breadth-first search path determination process 500 incorporating aspects of the present invention. As discussed further below in conjunction with FIGS. 6 through 13, each exemplary robot $R_1$ and $R_2$ executes the breadth-first search path determination process 500 to determine the next unvisited tile in navigating paths through the exemplary indoor environment 100.

As shown in FIG. 5, during step 510, each robot takes one hypothetical step (in software) in all directions, maintaining a Breath First Search (BFS) tree of its complete set of paths. BFS trees are discussed further below in conjunction with FIG. 6A. In step 520, the robots develop their BFS trees to one additional level of depth and any robot that finds an as-yet unvisited tile declares this fact, along with the path by which the tile was found, to the other robots. Call any robots which find such previously unvisited tiles the "declaring" robots. The declaration is made using whatever type of robot-to-robot, or robot-to-server-to-robot communication, is in place. In step 530, a decision/control point is reached. If no new tile has been found by any robot, step 510 is repeated and the robots all develop their BFS trees to an additional level of depth. If, on the other hand, an unvisited tile has been encountered by one or more of the robots, steps 540 and 550 are performed by the robots not finding the unvisited tile, and step 560 is performed by robots finding a tile.

These sets of steps can be performed in parallel by the two sets of robots. If two robots find the same tile, an arbitrary method may be used for deciding which robot gets to be the declaring robot and hence follow step 560, and which robot gets to be the non-declaring robot. For example, the robots may be pre-numbered (indexed) $R_1, \ldots, R_k$, as previously done in the Potential Field Radius Determination Process, 200, with the lower-numbered robot becoming the "declaring" robot. In step 540, the non-declaring robots go through their respective BFS trees to see if there is a conflict with any of the paths of the declaring robots. Any time a non-declaring robot is at a given tile T at the same time as a declaring robot, it is considered a conflict, and moreover, if a non-declaring robot is moving from a tile T to a tile T' at the same time as a declaring robot is moving from tile T' to tile T it is considered a conflict. Any robots finding a conflict in step 540 must regenerate their BFS trees avoiding any conflicts in step 550. In parallel with these activities by the non-declaring robots, the declaring robots each collapse their BFS trees to the single path taken to reach their just-found, previously unvisited, tile in step 560. Upon completion of steps 540 and 550 by all non-declaring robots, and step 560 by all declaring robots, control returns to step 510 where the robots again develop their BFS trees to an additional level of depth. The process terminates in step 580 when all tiles have been explored and so the respective BFS trees cannot be further developed.

For R robots and N total tiles with tiles having constant connectivity (4-connectivity for robots constrained to moving orthogonally between rectangular tiles, and 8-connectivity for robots free to traverse diagonally across rectangular tiles), the running time of the breadth-first search path determination process 500 is $O(KN^2)$ since a BFS tree at any node for any robot takes O(N) time to generate, and at each node there is time $N+O(N)=O(N)$ to first check for a path conflict, and then regenerate the BFS starting at a given depth. Given N total nodes and K robots, a total running time of $O(KN^2)$ can be expected, which can be completely parallelized down to $O(N^2)$ time per robot. The expected running time is likely much less since two robots will only have a conflict if their BFS trees discover the same tile at the same time increment.

The total space complexity of the breadth-first search path determination process 500 is also $O(KN^2)$ since a robot maintains information of size O(N) at each of up to O(N) tiles, and this space requirement is again parallelizable down to $O(N^2)$.

Figure 6:
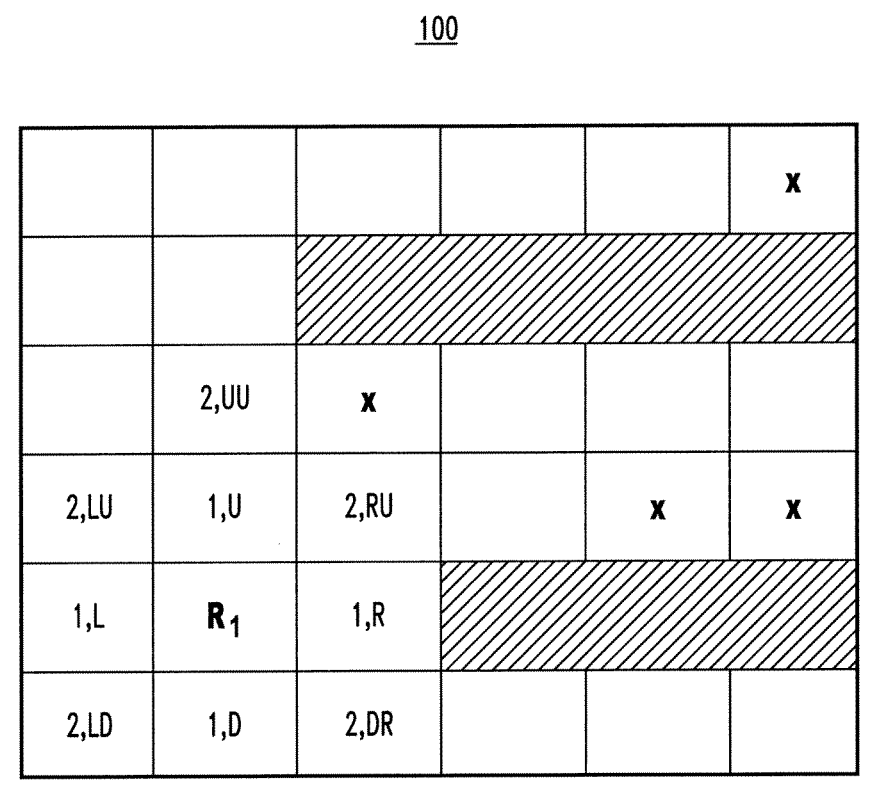

The breadth-first search path determination process 500 can optionally be computed by any one robot (or all of the robots) and hence be performed without communication between the robots or between robots and a server, other than at startup (although at greater cost in terms of computational time and space), FIGS. 6 through 13 illustrate the execution over time of the breadth-first search path determination process 500 to determine the next unvisited tile in navigating paths through the exemplary indoor environment 100 for robots constrained to moving orthogonally between square tiles, beginning in FIG. 6, with just four as yet unvisited tiles—where the unvisited tiles are denoted with Xs.

FIG. 6 illustrates two iterations of the Breadth First Search path determination process 500 by Robot $R_1$ as it continues to expand its BFS Tree. In the exemplary notation used in FIGS. 6 through 13, "n, Direction" indicates a number (n) of iterations associated with a robot movement and the concatenated Direction of movements required by the robot to reach a given tile from a starting tile. For example, "1, U" indicates a first movement in an upward direction. Likewise, D indicates a move in a downward direction, R indicates a move in a right-hand direction and L indicates a move in a left-hand direction. Thus, the notation "2, RU" indicates that the robot can move to the indicated tile in two iterations with a right-hand movement followed by an upward movement. Similarly, the notation "2, DR" indicates that the robot can move to the indicated tile in two iterations with a downward movement followed by a right-hand movement.

Figure 6A:
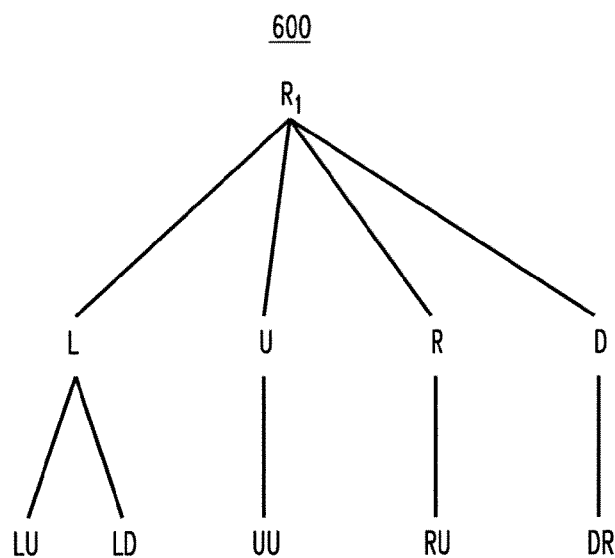

FIG. 6A illustrates the same two iterations of the BFS Tree 600 as discussed above in conjunction with FIG. 6, as implemented by robot $R_1$, but rendering the tracing of the hypothetical paths in the more-traditional "tree structure." Note, for example, that the robot $R_1$ could have reached the tile diagonally below it via a downward (D) motion followed by a leftward (L) motion, as well as the given leftward (L) motion followed by downward (D) motion. The choice of which of these to use is arbitrary.

Figure 7:
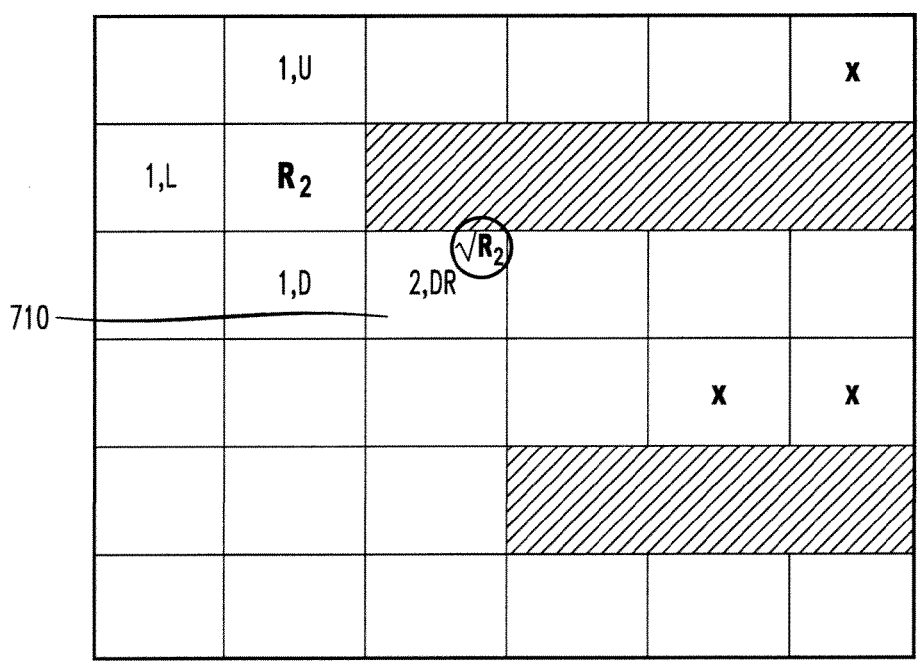

FIG. 7 illustrates the second iteration of the Breadth First Search path determination process 500 by robot $R_2$ as it continues to expand its BFS Tree. As shown in FIG. 7, robot $R_2$ hits an unvisited tile 710 during the second iteration using a first downward movement, followed by a right-hand movement. The declaring robot $R_2$ broadcasts the fact that the unvisited tile 710 has been found to the other robot, along with the path (DR). Robot $R_1$ receives notification of the previously unvisited tile 710 and robot $R_1$ changes the tile indicator from unvisited (X) to visited by $R_2$ ($\sqrt{R_2}$).

Figure 8:
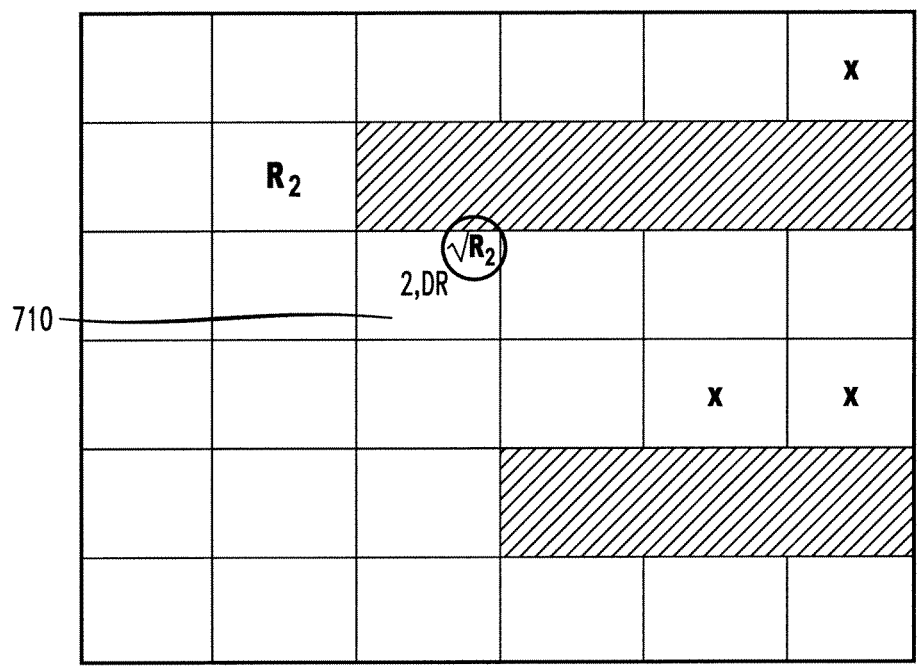

FIG. 8 illustrates the continued execution of the Breadth First Search path determination process 500 by robot $R_2$ after detection of the previously unvisited tile 710. As shown in FIG. 8, robot $R_2$ collapses its search tree to a single point associated with previously unvisited tile 710, so that on the next iteration, the BFS of robot $R_2$ can start over at that point.

FIG. 9 illustrates the continued execution of the Breadth First Search path determination process 500 during a fourth iteration by robot $R_1$ as $R_1$ expands its BFS to find a new unvisited tile 910. As shown in FIG. 9, robot $R_1$ hits the unvisited tile 910 during the fourth iteration using a right-hand movement, followed by an upward movement, followed by two successive right-hand movements (RURR). The declaring robot $R_1$ broadcasts the fact that the unvisited tile 910 has been found to the other robot, along with the path (RURR). Robot $R_2$ receives notification of the previously unvisited tile 910 and robot $R_2$ changes the tile indicator from unvisited (X) to visited by $R_1$ ($\sqrt{R_1}$).

Figure 10:
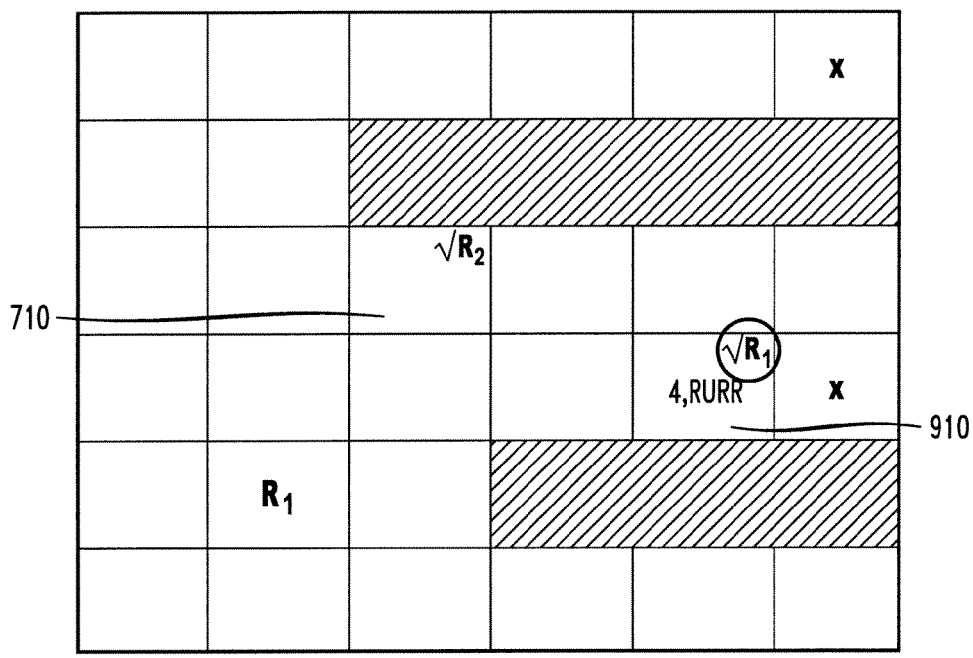

FIG. 10 illustrates the continued execution of the Breadth First Search path determination process 500 by robot $R_1$ after detection of the previously unvisited tile 910. As shown in FIG. 10, robot $R_1$ collapses its search tree to a single point associated with previously unvisited tile 910, so that on the next iteration, the BFS of robot $R_1$ can start over at that point.

Figure 11:
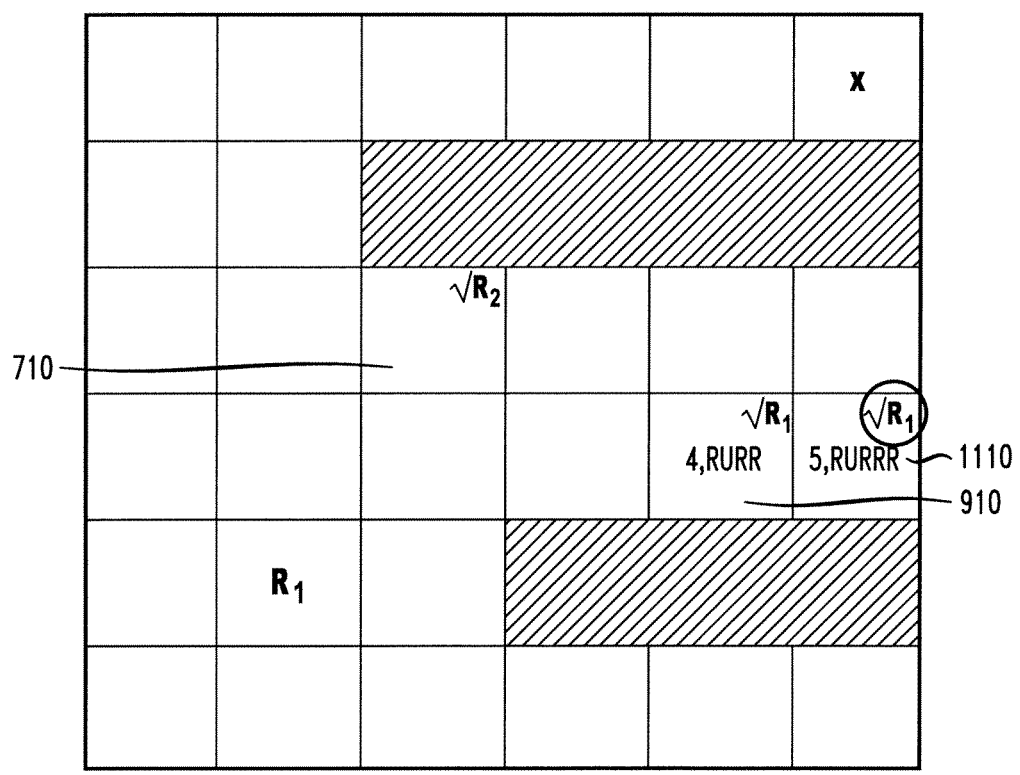

FIG. 11 illustrates the continued execution of the Breadth First Search path determination process 500 during a fifth iteration by robot $R_1$ as $R_1$ expands its BFS to find a new unvisited tile 1110. As shown in FIG. 11, robot $R_1$ hits the unvisited tile 1110 during the fifth iteration using the sequence of movements (RURRR). The declaring robot $R_1$ broadcasts the fact that the unvisited tile 1110 has been found to the other robot, along with the path (RURRR). Robot $R_2$ receives notification of the previously unvisited tile 1110 and robot $R_2$ changes the tile indicator from unvisited (X) to visited by $R_1$ ($\sqrt{R_1}$).

FIG. 12 illustrates the continued execution of the Breadth First Search path determination process 500 during a fifth iteration by robot $R_2$. As shown in FIG. 12, Robot $R_2$ has changed the tile indicator for previously unvisited tile 1110 from unvisited (X) to visited by $R_1$ ($\sqrt{R_1}$).

Figure 13:
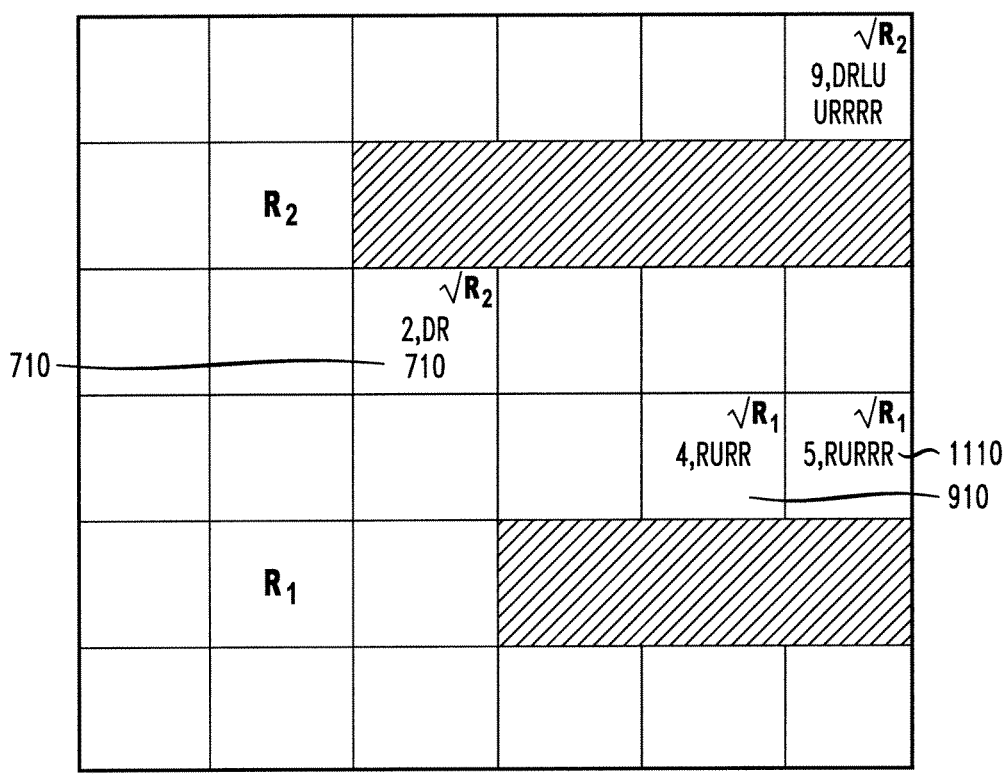

FIG. 13 indicates the ultimate paths of the robots $R_1$ and $R_2$ following completion of the Breadth First Search path determination process 500, with all tiles now marked as visited.

According to an exemplary embodiment, each robot also has a vision component, e.g., a mounted camera. In the context of a regularly gridded (e.g., tiled) room such as a data center, the vision component of the robot is responsible for detecting a "pose" of the robot with respect to the center of a tile, and for determining whether the next tile which the robot wishes to investigate is visitable or blocked (for example, because the tile is occupied by equipment or otherwise obstructed). The pose of the robot is the location and orientation of the robot relative to the forward pointing "orthogonal" orientation at the center of the tile. The forward pointing orthogonal orientation is the orientation that is exactly aligned with the intended reckoning of the robot (from the center of one tile to the center of a second adjacent tile) such that if the robot moved straight ahead it would cross the boundary between the tiles along a path which is perpendicular (orthogonal) to the tile boundary and reach the center of the second tile in which it either intends to get to or intends to inspect, with the purpose of determining whether the second tile is visitable. This assumes that a (theoretical) straight line connecting the centers of two adjacent tiles is perpendicular (orthogonal) to the boundary between the two tiles, which is typically the case in data centers.

In the data center context, the vision component specializes in detecting tile boundaries, determining a distance of the robot from a tile boundary (and thereby, a distance of the robot from the center of the tile), determining an angle the robot currently makes with the line orthogonal to the next tile boundary, and determining whether the next tile in the direction the robot is headed is occupied or visitable. According to an exemplary embodiment, the robot automatically determines, e.g., tile boundaries and whether a tile is visitable or obstructed. The programming of the robot to perform this task would be apparent to one of skill in the art and thus is not described further herein. For orientation purposes, the robot has a forward-pointing direction determined by the direction in which the vision component, e.g., camera, faces. This forward-pointing direction is also aligned with a forward wheel direction when the robot is instructed to move forward (i.e., when the robot rotates, it is not just the wheels that rotate but the entire assembly).

In a more general facility where there is no guarantee of a gridded layout of tiles, one option is to lay down a fine rectangular grid (e.g., a grid with cell dimensions of 6 inches by 6 inches) of alpha or beta emitting particles to simulate tiles and subsequently (upon backtracking) have the robot detect the grid of alpha or beta emitting particles using methods akin to those used with a mounted webcam. While a webcam by itself would not be able to detect alpha or beta particles, once the location of the alpha or beta particles are known (e.g., using an alpha or beta detector such as a thin-film Geiger-Muller Counter), the webcam could take a snapshot of the vicinity around the alpha or beta particles and the robot could keep a record of the square determined by the alpha or beta particles and the surroundings, so that next time the robot could do a reasonable job of navigating back.

This artificially placed grid, i.e., virtual tiles, can serve to mark where the robot has been and to keep track of for example, a best-first, A* search (see Peter Hart et al., "A Formal Basis for the Heuristic Determination of Minimum Cost Paths," SIGART Newsletter, 37: 28-29 (1972)) or a depth-first search tree on the virtual tiles, to ensure a complete navigation of the environment, if that is desirable. A depth-first search tree is a software data structure that keeps track of an attempted complete exploration of a graph. In the case of these virtual tiles, the nodes of the graph are the virtual tiles and in one implementation of the depth first search tree, two tiles are connected by an edge of the graph if they are neighbors in the tile layout—in other words if the robot can travel from tile1 to tile2 without passing through additional tiles.

To provide free movement throughout the building, in one exemplary embodiment, the robots run on battery power. Preferably, the battery is rechargeable and the system further includes one or more charging stations (not shown). That way, if the robot runs low on power during a scan, the robot can proceed to the charging station, recharge and then resume the scan at the last location visited (see below). Techniques for configuring a mobile robot to return to a charging station to recharge are known to those of skill in the art and thus are not described further herein.

Techniques that may be employed in accordance with the present teachings to coordinate movement of the robot(s) around the building while at the same time performing the necessary sensor measurements will now be described. In a data center, for example, coordinating movement of the robot(s) is facilitated somewhat by the fact that the typical data center floor consists entirely of industry-standard two foot by two foot tiles. In this case, the localization of the robot can be accomplished using video means, as long as still pictures (provided by the robot (see above) of the floor) can be accurately analyzed and tile boundaries thereby determined. By way of example only, a computer or a human operator thereof can analyze still images taken by the robot(s) and can determine where the outer boundaries of a given tile reside.

As will be apparent from the following description, the system can utilize recognition of the boundaries of industry standard rectilinear tiles to accurately generate a floor plan previously unknown to it.

According to an exemplary embodiment, the system leverages existing location-awareness technology employing one or more of on-board sonar, laser and video, employing the methods of Simultaneous Localization and Mapping (SLAM). The heart of the SLAM process is to use the environment to update the position of the robot. Since the odometry of the robot, which can be used to give an estimate of a position of the robot, generally accumulates error or a "drift" over time, it cannot be solely relied upon to obtain the position of the robot. In addition to odometry, laser, sonar and/or video can be used to correct the position of the robot. This is accomplished using Extended Kalman Filters to extract features of the environment and then re-observing these features as the robot moves around. In the SLAM literature, features are generally called "landmarks." The Extended Kalman Filter keeps track of an estimate of the uncertainty in the position of the robot as well as uncertainty in the landmarks it has seen in the environment. The case of a robot navigation using a web-cam and navigating around a data center (or other building/facility) equipment guided by tile boundaries is just a special case of the more generic SLAM framework.

Once readings are taken at a particular location, the robot moves to the next location, using the navigation techniques of the present invention.

The techniques described herein extend naturally to cases which have heretofore not been considered in any detail in the literature, but which are of practical significance, namely:

(i) Robots have varying speeds;
(ii) Robots have varying quality factors—i.e. robot $R_i$ does a more effective job, or is more thorough in its monitoring, than some fixed standard robot R by a factor $f_i$. All monitoring locations must be covered with a minimum total quality factor; and
(iii) Subregions of the environment have varying priorities While FIGS. 2 and 5 show an exemplary sequence of steps, it is also an embodiment of the present invention that these sequences may be varied. Various permutations of the algorithms are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 14:
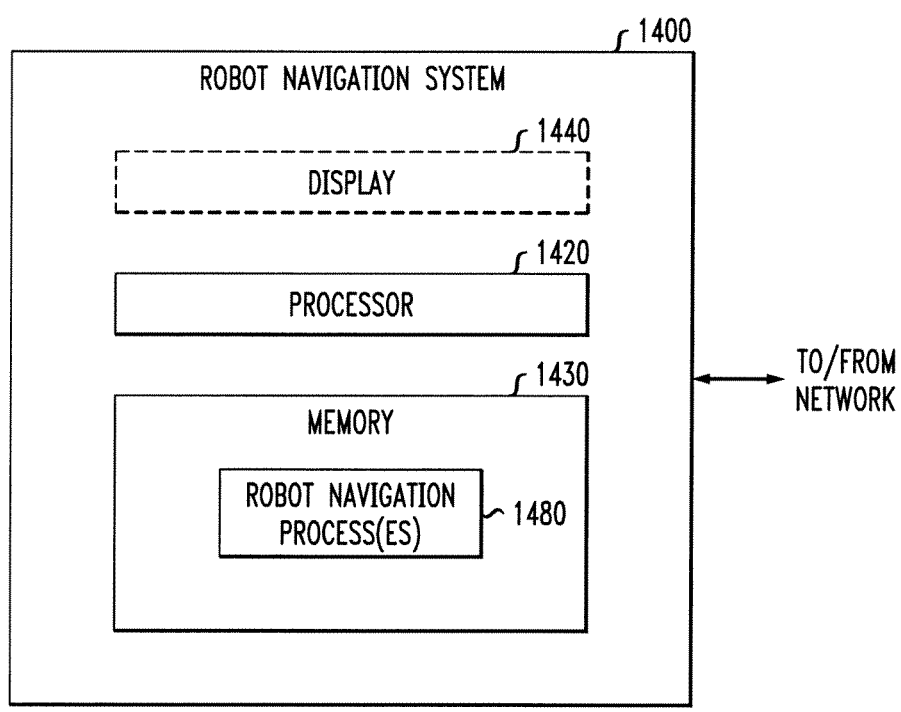
FIG. 14 is a block diagram of a robot navigation system that can implement the processes of the present invention.

FIG. 14 is a block diagram of a robot navigation system 1400 that can implement the processes of the present invention. As shown in FIG. 14, memory 1430 configures the processor 1420 to implement the robot navigation methods, steps, and functions disclosed herein (collectively, shown as 1480 in FIG. 14). The memory 1430 could be distributed or local and the processor 1420 could be distributed or singular. The memory 1430 could be implemented as an electrical, magnetic or optical memory, or any combination of these or other types of storage devices. It should be noted that each distributed processor that makes up processor 1420 generally contains its own addressable memory space. It should also be noted that some or all of computer system 200 can be incorporated into a personal computer, laptop computer, handheld computing device, application-specific circuit or general-use integrated circuit.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. A robot apparatus for navigating in an environment, comprising:
   a memory; and
   at least one processing device, coupled to the memory, operative to:
   obtain a discretization of said environment to a plurality of discrete regions;
   determine, using one or more of said at least one processing device of said robot apparatus, a next unvisited discrete region in said environment for said robot apparatus to explore in said exemplary environment using one or more of a breadth-first search and a depth-first search;
   determine, using one or more of said at least one processing device of said robot apparatus, if at least a second robot encounters a conflict with a path in said environment of said robot apparatus to said next unvisited discrete region in said environment by processing one or more trees generated by said one or more of said breadth-first search and said depth-first search of said second robot; and
   in response to said conflict detected by processing said one or more trees, generate, using one or more of said at least one processing device of said robot apparatus, one or more of at least one new breadth-first search tree and at least one new depth-first search tree for at least one of said robot apparatus and said second robot,
   wherein at least one of said robot apparatus and said second robot navigates within said environment using one or more of said at least one new breadth-first search tree and said at least one new depth-first search tree.

2. The robot apparatus of claim 1, wherein said environment comprises a known environment.

3. The robot apparatus of claim 1, wherein said determination of said next unvisited discrete region in said environment further comprises each robot in a plurality of robots taking a hypothetical step into one of said discrete regions at a time in all possible directions, and maintaining a breath-first search tree of paths until one robot reaches said next unvisited discrete region.

4. The apparatus of claim 1, wherein said conflict comprises one or more of (i) said robot apparatus and said second robot are at a same discrete region at a same time, and (ii) given two discrete regions t and s, one of said robot apparatus and said second robot went from discrete region t to discrete region s while the other of said robot apparatus and said second robot went from discrete region s to discrete region t.

5. An article of manufacture for navigating a robot apparatus in an environment, comprising a tangible machine readable recordable medium containing one or more programs which when executed implement the steps of:
obtaining a discretization of said environment to a plurality of discrete regions;
determining, using one or more of said at least one processing device of said robot apparatus, a next unvisited discrete region in said environment for said robot apparatus to explore in said exemplary environment using one or more of a breadth-first search and a depth-first search;
determining, using one or more of said at least one processing device of said robot apparatus, if at least a second robot encounters a conflict with a path in said environment of said robot apparatus to said next unvisited discrete region in said environment by processing one or more trees generated by said one or more of said breadth-first search and said depth-first search of said second robot; and
in response to said conflict detected by processing said one or more trees, generate, using one or more of said at least one processing device of said robot apparatus, one or more of at least one new breadth-first search tree and at least one new depth-first search tree for at least one of said robot apparatus and said second robot,
wherein at least one of said robot apparatus and said second robot navigates within said environment using one or more of said at least one new breadth-first search tree and said at least one new depth-first search tree.

6. The article of manufacture of claim 5, wherein said plurality of discrete regions comprise a plurality of real or virtual tiles.

7. The article of manufacture of claim 5, wherein said environment comprises a known environment.

8. The article of manufacture of claim 5, wherein said step of determining a next unvisited discrete region in said environment further comprises the steps of each robot in a plurality of robots taking a hypothetical step into one of said discrete regions at a time in all possible directions, and maintaining a breath-first search tree of paths until one robot reaches said next unvisited discrete region in said environment.

9. The article of manufacture of claim 8, wherein said determining step further comprises the steps of said robot apparatus declaring to others of the plurality of robots that said robot apparatus has reached said next unvisited discrete region in said environment in said breath-first search tree; said others of said plurality of robots determining if there is a conflict with said robot apparatus; and said robot apparatus collapsing said breadth-first search tree to a single point of said next unvisited discrete region in said environment.

10. The article of manufacture of claim 5, wherein said conflict comprises one or more of (i) said robot apparatus and said second robot are at a same discrete region at a same time, and (ii) given two discrete regions t and s, one of said robot apparatus and said second robot went from discrete region t to discrete region s while the other of said robot apparatus and said second robot went from discrete region s to discrete region t.

* * * * *